United States Patent [19]
Hughes

[11] Patent Number: 5,642,612
[45] Date of Patent: Jul. 1, 1997

[54] REPLACEABLE TIP CABLE HANDLER

[76] Inventor: Ceiriog Hughes, 8447 Edwood Rd., Pittsburgh, Pa. 15237

[21] Appl. No.: 574,726

[22] Filed: Dec. 19, 1995

[51] Int. Cl.$^6$ ................................................ F16G 13/16
[52] U.S. Cl. ............................ 59/78.1; 248/49; 248/75
[58] Field of Search ........................ 299/42, 43; 248/49, 248/68.1, 74.1, 75; 59/78.1

[56] References Cited

U.S. PATENT DOCUMENTS

| | | | |
|---|---|---|---|
| 3,192,704 | 7/1965 | Macrae | 59/78.1 |
| 3,367,718 | 2/1968 | Hauschopp | 299/43 |
| 3,861,751 | 1/1975 | Erwien | 299/43 |
| 3,997,039 | 12/1976 | Hubbard et al. | 191/121 |
| 4,006,875 | 2/1977 | Smith et al. | 248/75 |
| 4,103,974 | 8/1978 | Nowacki et al. | 299/43 |
| 4,119,348 | 10/1978 | Curtis | 299/43 |
| 4,185,874 | 1/1980 | Beckmann | 299/32 |
| 4,391,471 | 7/1983 | Hauschopp et al. | 299/43 |
| 4,458,950 | 7/1984 | Schwarting et al. | 299/43 |
| 4,483,567 | 11/1984 | Schwarting | 299/43 |
| 4,514,011 | 4/1985 | Lodwig et al. | 299/42 |
| 4,545,621 | 10/1985 | Sharp | 299/12 |
| 4,564,241 | 1/1986 | Holz et al. | 299/43 |
| 4,852,342 | 8/1989 | Hart | 248/49 X |
| 5,027,595 | 7/1991 | Hart | 59/78.1 |
| 5,497,536 | 3/1996 | Hart | 248/74.1 X |

OTHER PUBLICATIONS

"Mansign Nylon Cable Handling Chains" an American Longwall brochure (undated).

*Primary Examiner*—David J. Bagnell
*Attorney, Agent, or Firm*—Webb Ziesenheim Bruening Logsdon Orkin & Hanson, P.C.

[57] ABSTRACT

A replaceable tip cable handler having links in a chain with removable and replaceable tips, where flexible members, such as cable and hose, are received between respective sets of tips. The replaceable tip cable handler is a center pull towing design that avoids twisting of the cable handler while providing generous strength to protect the flexible members required by longwall mining machines. The replaceable tip cable handler allows operators of the mining machines to repair or upgrade the cable handler in minutes by changing the tips without the expense of replacing links or the complete chain of links. When a tip is broken off of a link, it can be replaced quickly and easily without removing the link or flexible members retained by the link and in turn reduces downtime of the cable handler. The tips on each link are used to retain the flexible members through the use of friction and provide for retention of each of the flexible members to each link. The form and dimension of the tip can be manufactured to retain various sizes and numbers of flexible members allowing current tips attached to a link to be replaced by an upgraded version to accommodate any flexible member configuration changes.

32 Claims, 3 Drawing Sheets

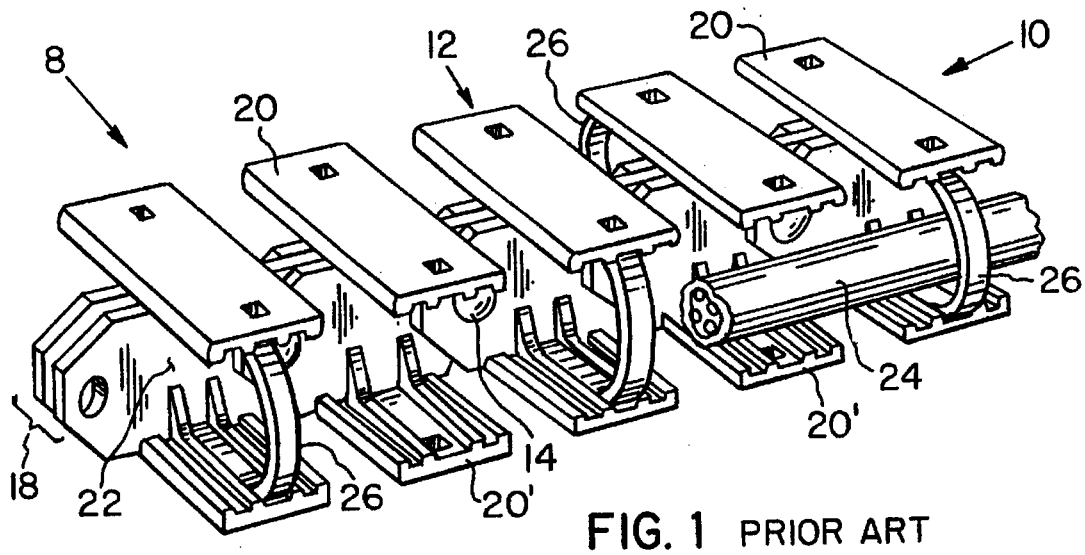
FIG. 1 PRIOR ART
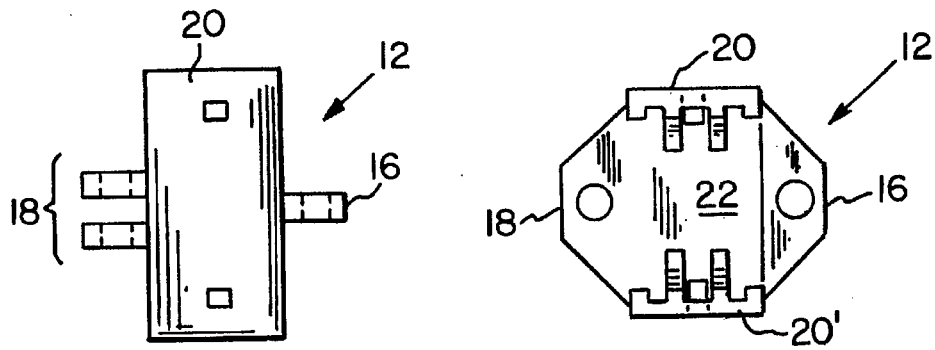
FIG. 2 PRIOR ART
FIG. 3 PRIOR ART
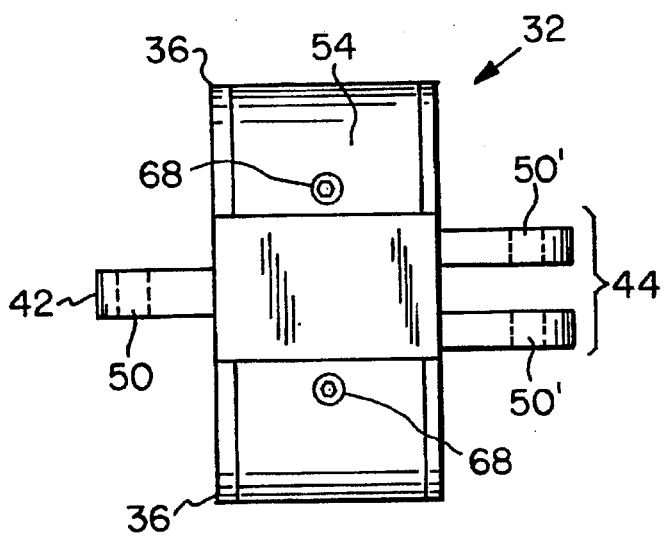
FIG. 6

REPLACEABLE TIP CABLE HANDLER

BACKGROUND OF THE INVENTION

1. Field of the Invention

The present invention relates to an apparatus that trails along with moving machinery and accommodates hose, cable or similar flexible supply lines required by the machinery to operate, and more particularly, to a cable handling system used in longwall mining operations.

2. Background Art

Longwall mining machines used in the mining industry require flexible cables and hoses, hereinafter referred to collectively as "flexible members". Longwall mining machines include a movable shearing machine. The flexible members trail behind the shearing machine and supply electric power, water and hydraulic fluid required for operation of the shearing machine. The longwall mining machines include cable handling systems that protect the flexible members from the harsh conditions attributed to mining and allow them to move along with the moving mining machine.

Usually moving mining machines are integrated with systems that have conveyors to move the mined material. These systems include cable guides or cable handlers as the cable handling system. The cable guide allows the flexible members to be guided along the conveyor as the flexible members trail the moving mining machine during mining operations. The cable handler retains and protects the flexible members as the cable handler moves along with the moving mining machine during mining operations. The following patents are examples of cable guides and cable handlers developed for longwall mining: U.S. Pat. Nos. 3,367,718; 3,861,751; 3,997,039; 4,103,974; 4,119,348; 4,185,874; 4,391,471; 4,458,950; 4,483,567; 4,514,011; 4,545,621; and 4,564,241.

FIGS. 1–3 show a Mansign center pull nylon cable handler 8 made by American Longwall Mining Corporation of Abingdon, Va. This cable handler is an industry standard. The Mansign cable handler 8 includes a flexible chain 10 made of nylon links 12. Links 12 are interconnected to each other by bolts 14. Each link 12 has a male end 16 for connecting with a female end 18 of an adjoining link 12. Each link 12 includes spaced apart parallel extending tips 20 and 20' integrally formed as part of link 12. Tips 20 and 20' extend outwardly from a center 22 of link 12. Flexible members 24 are positioned between tips 20 and 20' and are positioned on opposite sides of center 22. Tips 20 and 20' protect flexible members 24 from damage. A tempered spring steel clip 26 is secured to each link 12 to retain one of the two flexible members 24 (of which only one is shown) to link 12. The side of link 12 on which the steel clip 26 is positioned alternates with respect to adjacent links 12 in chain 10 as shown in FIG. 1.

Although the Mansign cable handler overcomes many of the known problems of earlier cable handler designs, it still has disadvantages. First, tips 20 and 20' tend to break off easily from center 22 during mining operations. Therefore, the cable handler cannot protect the exposed flexible member 24 where a tip 20 or 20' breaks off. Once one of the tips 20 or 20' breaks off from a link 12, that broken link 12 must be replaced by a new link 12. In order to replace the broken link, the respective steel clip 26 must be removed. Then male end 16 and female end 18 of broken link 12 must be unbolted from each adjoining link 12; a new link 12 must be inserted in its place; and steel clip 26 must be replaced. This results in expensive and time consuming procedures. A second disadvantage of the Mansign cable handler is that all of the links 12 must be replaced when changing the outer dimensional size of one of the flexible members or when adding more flexible members that the current links 12 cannot accommodate.

Therefore, it is an object of the present invention to provide a cable handling system having links that can be easily repaired when a tip breaks, thereby reducing the downtime and expense of repairing a cable handling system.

It is another object of the present invention to provide a cable handling system that can be reconfigured for the number of flexible members or the cross sectional size of the flexible members that each link can retain without replacing all of the links, thereby reducing the downtime and expense of a cable handling system during its reconfiguration.

SUMMARY OF THE INVENTION

Two of the problems with prior trailing cable handlers are damage due to adverse mining conditions and flexible member configuration changes after initial purchase of the cable handing system. The present invention, a replaceable tip cable handler, overcomes these problems by having links with removable and replaceable tips. The flexible members are received between respective sets of tips. The replaceable tip cable handler is a center pull towing design that avoids twisting of the cable handling system while providing generous strength to protect the flexible members required by longwall mining machines. The replaceable tip cable handler allows operators to repair or upgrade the cable handling system in minutes by changing the tips without the expense of replacing links or the complete chain of links. When a tip is broken off of the link, it can be replaced quickly and easily without removing the link or flexible members retained by the link and in turn reduces downtime of the cable handling system. In a situation where one of the flexible members is to be replaced, only one of the tips on each link needs to be removed to access that flexible member. The tips on each link are used to retain the flexible members through the use of friction and provide for retention of each of the flexible members to each link. The form and dimension of the tip can be manufactured to retain various sizes and numbers of flexible members allowing current tips attached to a link to be replaced by an upgraded version to accommodate any flexible member configuration changes.

A complete understanding of the invention will be obtained from the following description when taken in conjunction with the accompanying drawing figures wherein like reference characters identify like parts throughout.

BRIEF DESCRIPTION OF THE DRAWINGS

FIG. 1 is a perspective view of a prior art cable handler;

FIG. 2 is a plan view of a link of the cable handler shown in FIG. 1;

FIG. 3 is a side view of a link of the cable handler shown in FIG. 1;

FIG. 6 is a plan view of the link shown in FIGS. 4 and 5;

DESCRIPTION OF THE PREFERRED EMBODIMENT

Figure 4:
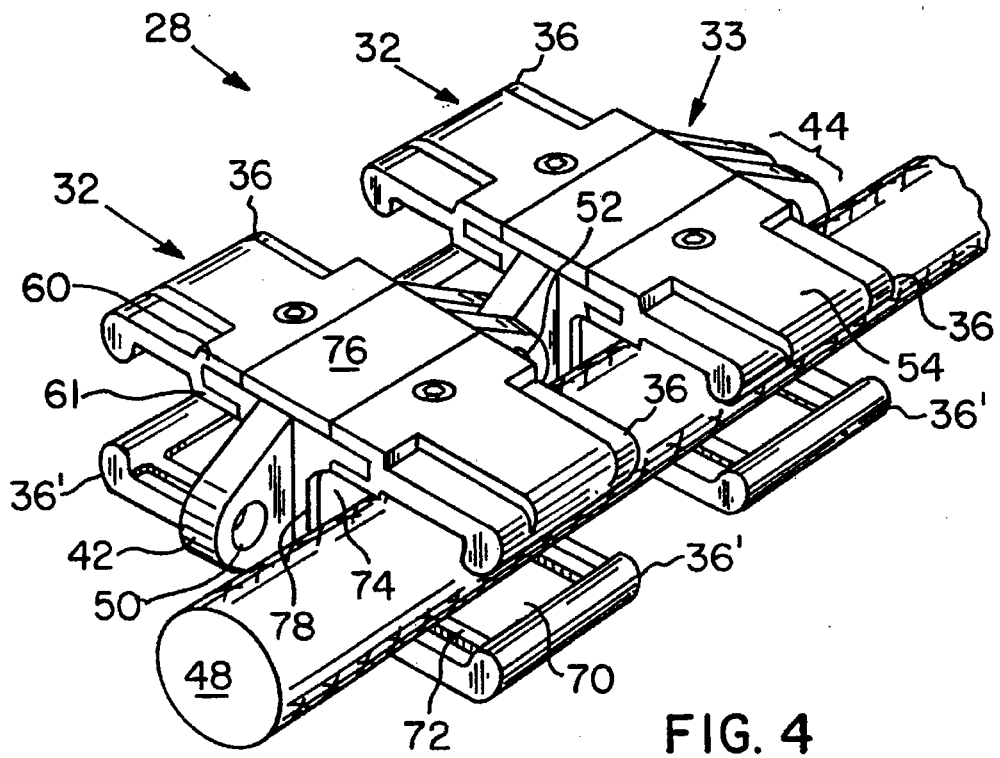
FIG. 4 is a perspective view of a replaceable tip cable handler made in accordance with the present invention.

FIGS. 4–8 show a replaceable tip cable handler 28 made in accordance with the present invention. The replaceable tip cable handler 28 includes a plurality of adjacent individual links 32 which adjoin to form a flexible chain 33 as shown in FIG. 4. Each link 32 includes a body 34 with an upper tip 36 and a lower tip 36' removably secured to each side of body 34.

Figure 5:
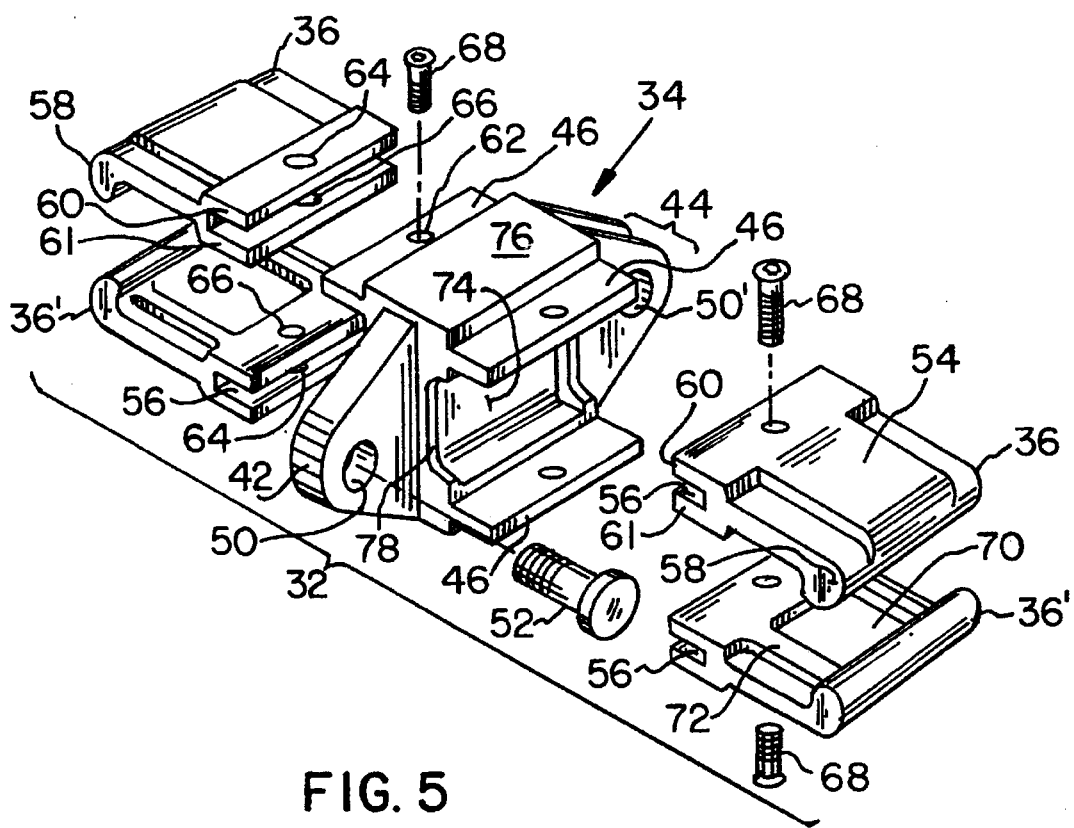
FIG. 5 is a perspective exploded view of a link of the cable handler as shown in FIG. 4.
Figure 7:
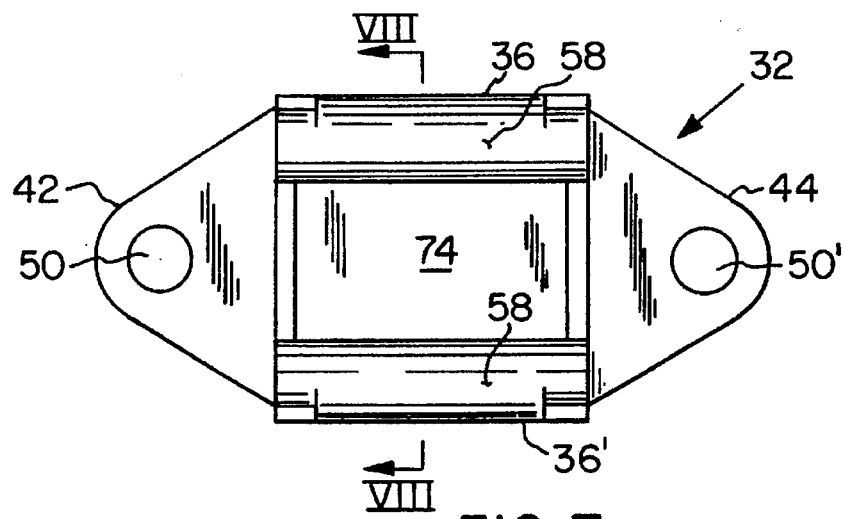
FIG. 7 is a side view of the link shown in FIGS. 5 and 6.
Figure 8:
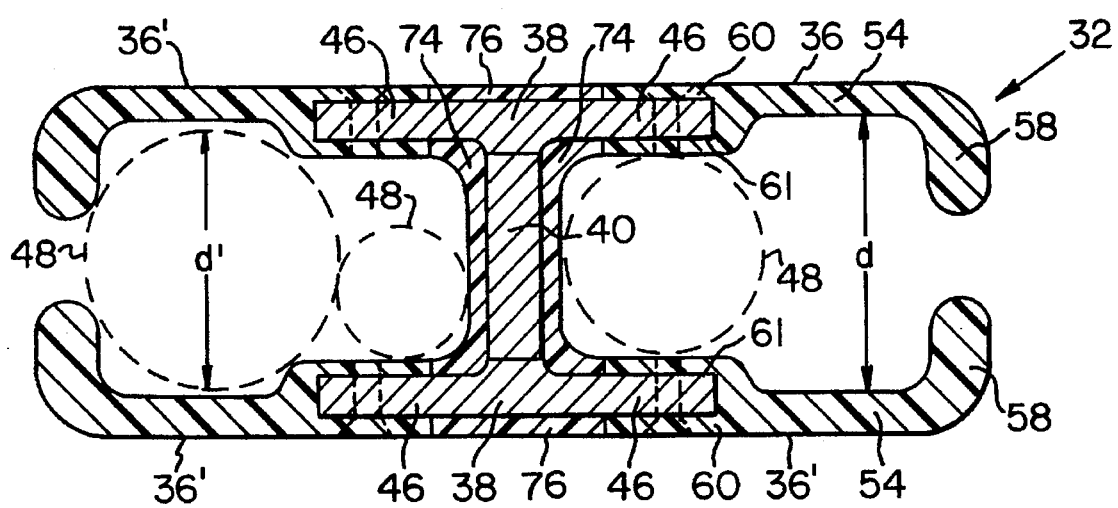
FIG. 8 is a sectional view taken along lines VIII—VIII in FIG. 7.

As shown in FIG. 8, each body 34 has an I-beam shape that includes two spaced apart flanges 38, 38' secured to a web 40. Referring to FIGS. 5–7, a male end 42 extends outwardly from one end of I-beam web 40. A female end 44 extends outwardly from an opposite end of I-beam web 40. Female end 44 is adapted to interconnect with male end 42 of an adjacent link 32 as shown in FIG. 4. Upper flange 38 and lower flange 38' of body 34 each have two flange ends 46 that interconnect, respectively, with the two upper tips 36 and the two lower tips 36' to form link 32. The distance "d" between upper tip 36 and lower tip 36' on each side of link 32 is slightly smaller than the outer dimension or diameter of "d'" of flexible members 48. A friction force is used to retain flexible members 48 between upper tip 36 and lower tip 36' on each side of link 32.

Body 34, male end 42 and female end 44 are preferably manufactured from steel and coated with cadmium to minimize corrosion. Male end 42 includes a lug having a hole 50 to receive a fastener 52 as shown in FIGS. 4 and 5. Female end 44 includes two spaced apart lugs to receive male end 42 therebetween. Each lug of the female end includes a hole 50' defined to receive a fastener 52. A bolt can be used as fastener 52 to connect male end 42 and female end 44 of adjacent links 32.

Referring to FIGS. 5 and 8, tips 36 and 36' are manufactured from plastic having a main body 54 that includes a slotted end 56 and a contoured end 58. Slotted end 56 is defined by two spaced apart legs 60 and 61 defining a slot therebetween. Slotted end 56 of each tip 36, 36' removably receives flange end 46 of body 34 between spaced apart legs 60 and 61 similar to a tongue and groove arrangement. Each flange end 46 has a hole 62; each leg 60 has a hole 64; and each leg 61 has a tapped hole 66. Holes 62, 64 and 66 are arranged so that they are coaxially aligned with each other when a tip 36 or 36' receives a flange end 46, as shown in FIG. 8. A fastener 68, such as a threaded bolt, passes through holes 64 and 62 and screws into hole 66 of leg 61 to removably secure tips 36 and 36' to a respective flange end 46.

The shape of main body 54 and contoured end 58 of tips 36, 36' can vary and depend on the outer dimension of flexible members 48 and how many flexible members 48 are to be retained by links 32. FIG. 8 shows several flexible members 48 in phantom engaging with tips 36 and 36'. Contoured end 58 is opposite slotted end 56 and main body 54 is positioned thereinbetween. The contoured end 58 depends inwardly toward flexible members 48 so as to aid in retaining flexible members 48. For example, contoured end 58 can be arcuate in shape and can curve inwardly. Main body 54 has an inside surface 70 upon which flexible member 48 rests and is frictionally retained. Inside surface 70 can include ribs 72 to provide a frictional surface for retaining flexible members 48.

Referring to FIGS. 5 and 8, each link includes contoured sections 74 and filler sections 76 which are plastic parts bonded to the steel body 34. One such process of bonding plastic to steel is the Adeed process. Contoured sections 74 are formed to fit the contours of flexible members 48 and abut against legs 61 of adjacent tips 36, 36' as shown in FIG. 8. This arrangement provides a proper fit by flexible members 48 against the body 34 when flexible members 48 are retained by link 32. Contoured sections 74 can include ribs 78 to provide a frictional surface for retaining flexible members 48. Filler sections 76 are used to fill in the center surface area of flanges 38, 38' which are not covered by leg 60 of slotted ends 56 so as to provide a smooth surface on the outside of link 32.

The plastic parts 74 and 76, the tips 36, 36' and the cadmium coating are preferably a white reflective color to promote high visibility of chain 30. The high visibility allows an operator to visually see missing or damaged links 32 and to see that chain 30 is aligned and tracking correctly behind the shearing machine. Although it is preferable to have body 34 manufactured from steel, it is envisioned that body 34 could be manufactured from other suitable materials, such as plastic. It is also envisioned that none of the above-mentioned components that make up link 32 is limited to the materials that are specified for their manufacture in this specification.

While the embodiment of the invention has been described in detail herein, it will be appreciated by those skilled in the art that various modifications and alternatives to the embodiment could be developed in light of the overall teachings of the disclosure. Accordingly, the particular arrangements are illustrative only and are not limiting as to the scope of the invention which is to be given the full breadth of the appended claims and any and all equivalents thereof.

I claim:

1. A cable handler for receiving and handling a flexible member, comprising:
    a flexible chain having a plurality of links adapted to retain and protect the flexible member, each of said links includes:
    a body adapted to interconnect with adjacent links; and
    two tips extending from a side of said body, said two tips forming a first set, wherein one of said tips is removably secured to said body and wherein said tips are spaced apart from each other and are adapted to receive and retain the flexible member therebetween.

2. A cable handler as claimed in claim 1, wherein said tips include a main body that is adapted to coact with the flexible member and a contoured end adjacent to said main body for retaining the flexible member and wherein said tip that is removably secured includes a mating end adjacent to said main body and opposite said contoured end for matingly engaging with said body of said link.

3. A cable handler as claimed in claim 2 further including a second set of two tips secured to said body, wherein one of said tips of said second set is removably secured to said body and wherein said tips of said second set are spaced apart from each other and are adapted to receive and retain another flexible member therebetween.

4. A cable handler as claimed in claim 3, wherein said main body of said tips frictionally engages the flexible member.

5. A cable handler as claimed in claim 4,
    wherein said body further includes a first end, a second end opposite said first end, two sides opposing each other and an upper section and a lower section opposing each other, and having said sides located between said upper and lower sections;
    and wherein each of said tips are removably secured to a flange end adjacent to each of said upper and lower sections on each of said sides and each of said tips extends outwardly from each of said sides that said tips are secured to for retaining the flexible member between said upper and lower sections.

6. A cable handler as claimed in claim 5, wherein said body is an I-beam shape having a web forming said sides, wherein said tips further include a slot in said mating end defined by a first leg and a second leg with said slot defined thereinbetween to receive said flange end in a tongue and groove arrangement.

7. A cable handler as claimed in claim 6, wherein said flange end, said first leg and said second leg each include a hole to receive a fastener to secure said tips to said body.

8. A cable handler as claimed in claim 6, wherein a distance between said main body of each of said tips extending from said upper and lower sections on each of said sides is slightly less than an outer dimension of the flexible member, thereby providing a frictional force to retain the flexible member.

9. A cable handler as claimed in claim 8, wherein said contour ends of each set of said tips depend toward each other and are adapted to retain the flexible members and said main body of said tips includes a rib that is adapted to contact the flexible member.

10. A cable handler as claimed in claim 9, wherein said body is made from steel and said tips are made from plastic.

11. A cable handler as claimed in claim 10 further including plastic contour sections bonded to each side of said web, said plastic contour sections having at least one rib adapted to retain the flexible member.

12. A cable handler as claimed in claim 11 further including plastic filler sections bonded to said upper and lower sections to fill a space formed between said first legs of each set of said tips when said tips are secured to said body.

13. A cable handler as claimed in claim 12, wherein said links are colored a reflective color to promote visibility by an operator.

14. A cable handler as claimed in claim 3, wherein all of said tips are removably secured to said body of said link and include a mating end for matingly engaging with said body of said link.

15. A cable handler as claimed in claim 6, wherein a male end extends from said first end of said body and a female end extends from said second end of said body, and wherein said male end is adapted to interconnect with said female end of an adjacent one of said links.

16. A link for a cable handler for receiving and handling a flexible member comprising:

a body adapted to interconnect said link to another said link to form a chain of links; and two tips extending from one side of said body, said two tips forming a first set, wherein one of said tips is removably secured to said body and wherein said tips are spaced apart from each other and are adapted to receive and retain the flexible member therebetween.

17. A link as claimed in claim 16, wherein said body further includes a first end, a second end opposite said first end, a center section and an upper section and a lower section opposing each other and having said center section located between said upper and lower sections, a male end extending from said first end, and a female end extending from said second end, where said male end has the capability to interconnect with said female end of another of said link, and wherein said link includes a second set of two tips, said tips each being removably secured to a flange end adjacent to each of said upper and lower sections on each side of said center section and said tips extending outwardly from each side of said center section for retaining said flexible member between said upper and lower sections.

18. A replacement tip for a cable handler having a body that receives and handles a flexible member comprising:

a main body for frictionally engaging the flexible member;

a mating end adapted to mate with a side of said body of said cable handler body; and a contoured end for retaining the flexible member.

19. A replacement tip as claimed in claim 18, wherein said main body further includes a rib that is adapted to contact the flexible member and wherein said contoured end is arcuate in shape.

20. A method for repairing a cable handler made up of a plurality of links, where each of the links includes a body and removable tips that receive and handle a flexible member comprising:

removing a broken tip from a side of the body; and securing a replacement tip to said side of the body.

21. A cable handler for receiving and handling a flexible member, comprising:

a flexible chain having a plurality of links adapted to retain and protect the flexible member, each of said links includes:

a body adapted to interconnect with adjacent links;

a first set of two tips secured to said body wherein one of said tips of said first set is removably secured to said body and wherein said tips of said first set are spaced apart from each other and are adapted to receive and retain the flexible member therebetween, said tips including a main body that is adapted to coact with the flexible member and a contoured end adjacent to said main body for retaining the flexible member and wherein said tip that is removably secured includes a mating end adjacent to said main body and opposite said contoured end for matingly engaging with said body of said link;

a second set of two tips secured to said body, wherein one of said tips of said second set is removably secured to said body and wherein said tips of said second set are spaced apart from each other and are adapted to receive and retain another flexible member therebetween;

wherein said main body of said tips frictionally engages the flexible member;

wherein said body further includes a first end, a second end opposite said first end, two sides opposing each other and an upper section and a lower section opposing each other, and having said sides located between said upper and lower sections;

and wherein each of said tips is removably secured to a flange end adjacent to each of said upper and lower sections on each of said sides and each of said tips extends outwardly from each of said sides that said tips are secured to for retaining the flexible member between said upper and lower sections.

22. A cable handler as claimed in claim 21, wherein said body is an I-beam shape having a web forming said sides, wherein said tips further include a slot in said mating end defined by a first leg and a second leg with said slot defined thereinbetween to receive said flange end in a tongue and groove arrangement.

23. A cable handler as claimed in claim 22, wherein said flange end, said first leg and said second leg each include a hole to receive a fastener to secure said tips to said body.

24. A cable handler as claimed in claim 22, wherein a distance between said main body of each of said tips extending from said upper and lower sections on each of said sides is slightly less than an outer dimension of the flexible member, thereby providing a frictional force to retain the flexible member.

25. A cable handler as claimed in claim 24, wherein said contour ends of each set of said tips depend toward each other and are adapted to retain the flexible members and said main body of said tips includes a rib that is adapted to contact the flexible member.

26. A cable handler as claimed in claim 25, wherein said body is made from steel and said tips are made from plastic.

27. A cable handler as claimed in claim 26 further including plastic contour sections bonded to each side of said web, said plastic contour sections having at least one rib adapted to retain the flexible member.

28. A cable handler as claimed in claim 27 further including plastic filler sections bonded to said upper and lower sections to fill a space formed between said first legs of each set of said tips when said tips are secured to said body.

29. A cable handler as claimed in claim 28, wherein said links are colored a reflective color to promote visibility by an operator.

30. A cable handler as claimed in claim 21, wherein a male end extends from said first end of said body and a female end extends from said second end of said body, and wherein said male end is adapted to interconnect with said female end of an adjacent one of said links.

31. A link for a cable handler for receiving and handling a flexible member comprising:

a body adapted to interconnect said link to another said link to form a chain of links; and two tips secured to said body, said two tips forming a first set, wherein one of said tips is removably secured to said body and wherein said tips are spaced apart from each other and are adapted to receive and retain the flexible member therebetween, wherein said body further includes a first end, a second end opposite said first end, a center section and an upper section and a lower section opposing each other and having said center section located between said upper and lower sections, a male end extending from said first end, and a female end extending from said second end, where said male end has the capability to interconnect with said female end of another of said link, and wherein said link includes a second set of two tips, said tips each being removably secured to a flange end adjacent to each of said upper and lower sections on each side of said center section and said tips extending outwardly from each side of said center section for retaining said flexible member between said upper and lower sections.

32. A cable handler for receiving and handling a flexible member, comprising:

a flexible chain having a plurality of links adapted to retain and protect the flexible member, each of said links includes:

a body adapted to interconnect with adjacent links; and two tips secured to said body, said two tips forming a first set, wherein one of said tips is removably secured to said body and wherein said tips are spaced apart from each other and are adapted to receive and retain the flexible member therebetween;

wherein said body further includes a first end, a second end opposite said first end, two sides opposing each other and an upper section and a lower section opposing each other, and having said sides located between said upper and lower sections;

and wherein each of said tips is removably secured to a flange end adjacent to each of said upper and lower sections on each of said sides and each of said tips extends outwardly from each of said sides that said tips are secured to for retaining the flexible member between said upper and lower sections.

* * * * *

UNITED STATES PATENT AND TRADEMARK OFFICE
CERTIFICATE OF CORRECTION

PATENT NO. : 5,642,612
DATED : July 1, 1997
INVENTOR(S) : Ceiriog Hughes

It is certified that error appears in the above-indentified patent and that said Letters Patent is hereby corrected as shown below:

Claim 15 Column 5 Line 43 "claimed in claim 6" should read --claimed in claim 5--.

Signed and Sealed this

Twenty-first Day of October 1997

*Attest:*

BRUCE LEHMAN

*Attesting Officer*            *Commissioner of Patents and Trademarks*